United States Patent [19]

Föhl

[11] 4,232,836
[45] Nov. 11, 1980

[54] RE-TIGHTENER WITH PYROTECHNIC PROPELLANT CHARGE FOR SAFETY-BELT AUTOMATIC WIND-UP DEVICES

[75] Inventor: Artur Föhl, Schorndorf, Fed. Rep. of Germany

[73] Assignee: REPA Feinstanzwerk GmbH, Alfdorf, Fed. Rep. of Germany

[21] Appl. No.: 26,078

[22] Filed: Apr. 2, 1979

[30] Foreign Application Priority Data

Apr. 4, 1978 [DE] Fed. Rep. of Germany ....... 2814550

[51] Int. Cl.$^3$ ...................... A67B 35/00; B65H 75/48
[52] U.S. Cl. .............................. 242/107; 242/107.4 R; 280/807
[58] Field of Search ............................ 242/107–107.7; 280/801–808; 244/122 B; 180/268; 297/475–480

[56] References Cited

U.S. PATENT DOCUMENTS 4,014,479  3/1977  Nilsson ......................... 242/107.4 R
4,142,692  3/1979  Andres ................................. 242/107

FOREIGN PATENT DOCUMENTS 2460119  6/1976  Fed. Rep. of Germany .... 242/107.4 R

Primary Examiner—John M. Jillions
Attorney, Agent, or Firm—Herbert L. Lerner

[57] ABSTRACT

Retightener with a pyrotechnic propellant charge for automatic safety-belt wind-up devices having an energy converter, wherein in the event of danger the explosive pressure of the ignited propellant charge acts on a pull-out element tightening the safety belt around the body of the vehicle passenger to be protected via a liquid buffer arranged between the propellant charge and a pullback element. In accordance with the invention a receptacle which contains the liquid buffer is coupled to the winding shaft and rotates together with the latter. In the circumferential surface of the receptacle is at least one jet nozzle directed substantially tangentially to the axis of rotation and against a stationary guide ring surrounding the receptacle.

9 Claims, 3 Drawing Figures

U.S. Patent  Nov 11, 1980  4,232,836
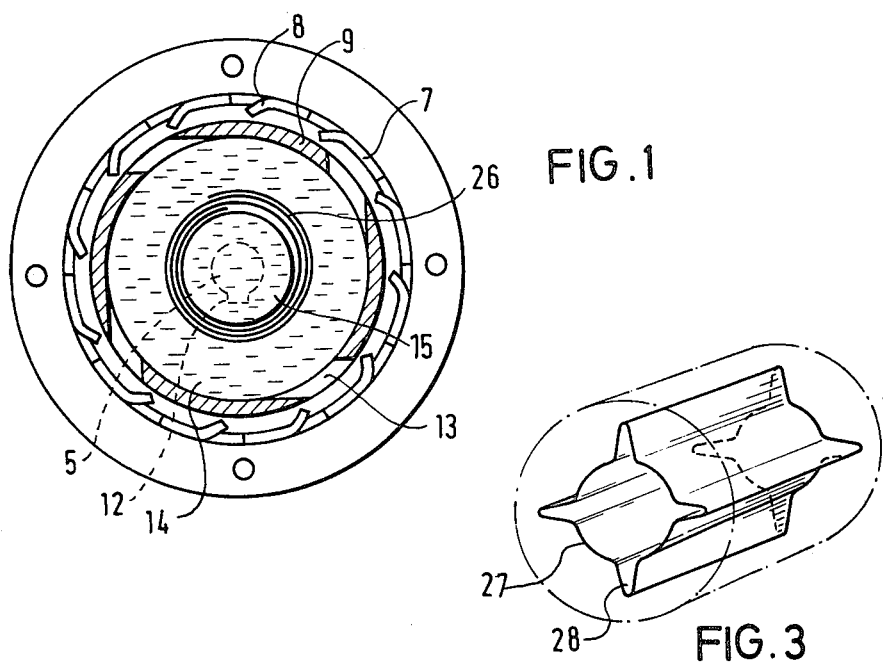
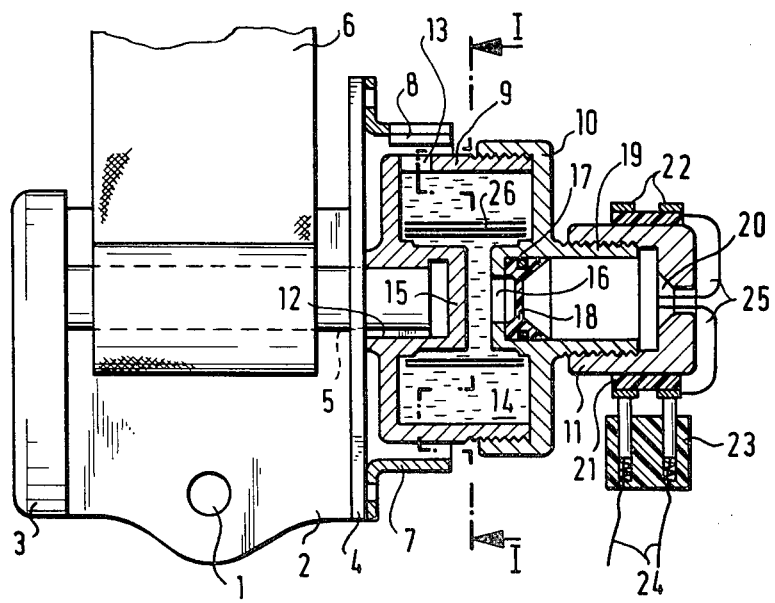

RE-TIGHTENER WITH PYROTECHNIC PROPELLANT CHARGE FOR SAFETY-BELT AUTOMATIC WIND-UP DEVICES

CROSS-REFERENCE TO RELATED APPLICATION

The following application, assigned to REPA Feinstanzwerk GMBH, the assignee of the present application, is hereby incorporated by reference: U.S. application Ser. No. 834,794, filed for Artur Föohl, on Sept. 19, 1977.

FIELD OF THE INVENTION

The invention relates to a retightener or pullback device with a pyrotechnic propellant charge for safety-belt automatic windup devices having an energy converter, wherein in the event of danger the explosive pressure of the ignited propellant charge acts on a pullback element tightening the safety belt around the body of the vehicle passenger to be protected, via a liquid buffer arranged between the propellant charge and a pullback element.

DESCRIPTION OF THE PRIOR ART

In the above-mentioned pullback device according to related U.S. application Ser. No. 834,794, the liquid buffer or liquid medium is thrown against a free-standing turbine wheel through a jet nozzle by the firing of the propellant charge in the event of danger, whereby the pullback element is set in rotation and the safety belt is tightened around the body of the vehilce passenger.

Contrary thereto, in another known wind-up device for eliminating the belt slack of a safety belt system, German Published Non-Prosecuted Application No. 26 25 573, a pullback torque is obtained by the provision that a liquid buffer located in the hollow winding shaft for the safety belt is pushed by the explosive pressure of a propellant charge through radial holes of a wheel connected to the winding shaft at high speed by means of an axially movable piston, whereby a rotary impulse is imparted to the wheel. A disadvantage is here the circumstance that the volume of liquid is relatively small and the pulse duration short, so that in this drive system the pulse amplitude is relatively small. Also, the system is expensive to produce due to the presence of relatively long discharge holes of small cross section.

SUMMARY OF THE INVENTION

It is now an object of the present invention to provide a pullback device of the type described with improved efficiency and mechanical design.

With the foregoing and other objects in view, there is provided in accordance with the invention, a retightener for safety-belt automatic wind-up devices having a winding shaft mounted in a bearing block, a safety belt wound around the shaft, a retightening element connected to the shaft, with a pyrotechnic propellant charge which when activated by firing the charge generates an explosive pressure on the retightening element to tighten the safety belt around the body of a motor vehicle passenger to be protected and a liquid medium disposed intermediate the retightener and the pyrotechnic propellant charge, the improvement including a receptacle having a circumferential surface containing the liquid medium coupled to the winding shaft and rotated with the winding shaft, and at least one jet nozzle disposed in the circumferential surface of the receptacle directed substantially tangentially to the axis of rotation of the winding shaft and against a stationary guide ring surrounding the receptacle.

Other features which are considered as characteristic for the invention are set forth in the appended claims.

Although the invention is illustrated and described herein as embodied in a retightener with pyrotechnic propellant charge for safety-belt automatic wind-up devices, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 1 is a cross-sectional side view taken along line I—I of FIG. 2 showing the pullback device in accordance with the invention, FIG. 2 shows a cross-sectional top view of the pullback device, and, FIG. 3 shows an alternative displacement element in the pullback device.

DETAILED DESCRIPTION OF THE INVENTION

According to the invention, a receptacle, which contains the liquid buffer, is coupled to the winding shaft and rotates with the latter. The receptacle has in its circumferential surface at least one jet nozzle directed substantially tangentially to the axis of rotation and against a stationary guide ring which surrounds the receptacle. The guide ring preferably has guide vanes which are bent toward the receptacle and are directed substantially perpendicularly to the jet direction of the jet nozzle. In this connection it is advantageous to provide a multiplicity of such jet nozzles on the circumference of the receptacle which may have the shape of a capsule. The guide ring, which surrounds the circumference of the receptacle, covers the jet nozzle or nozzles with only little spacing between nozzle and guide ring. The guide ring together with the receptacle form a largely closed turbine system, wherein the liquid jet issuing from the jet nozzles when the propellant charge is fired, hits the guide ring or its guide vanes directly and, due to the short distance between the jet nozzle and the guide ring, the jet is highly concentrated, and thereby imparts a strong rotary impulse to the rotatable receptacle. The liquid can subsequently run unimpeded, laterally off the guide ring. A particular advantage is the circumstance that substantially larger amounts of liquid can be accommodated in such a rotatable receptacle than, for instance, in the hollow winding shaft of the aforementioned known system. The efficiency of the pullback device according to the invention is high, for one reason that the liquid jet or jets leave the receptacle tangentially to the winding shaft and hit the directly adjacent guide vanes of the guide ring practically perpendicularly.

According to a further embodiment of the invention, a tubular displacement element for the liquid buffer, which can be radially expanded by the explosive pressure of the propellant charge against the jet nozzle or jet nozzles distributed over the receptacle circumference is arranged in the liquid chamber of the receptacle. This displacement element has the effect of a driving piston but, as compared to driving pistons of known systems, has the advantage of radial expandability and therefore, of a larger displacement volume per unit time.

According to a further embodiment of the invention, the displacement element is designed in a simple manner as a flexible, flat spiral spring which can expand under pressure. In accordance with an alternative embodiment, the displacement element can also be provided in the form of a tube which consists of easily deformable material and has folded ribs. Within the scope of the invention, still other displacement elements can, of course, also be used, such as elastic diaphragms or the like.

The mechanical design of the pullback device according to the invention is simplified by the provision that the receptacle, together with an axial extension containing the propellant charge, forms a rotatable structural unit which can be coupled to the winding shaft. The manufacture as well as the assembly of the individual parts forming the pullback device according to the invention is substantially simplified if the extension containing the propellant charge is part of a screw cap which closes off the cup-shaped receptacle and is connected to a stationary ignition contact device consisting of a slip ring and brushes.

Further advantageous details of the invention will be seen from the embodiment example described in the following and shown in the drawings.

Referring to FIGS. 1 and 2, a fitting or anchoring plate 2 of an automatic safety-belt wind-up device can be fastened by means of a hole 1, for instance, to the body frame of a motor vehicle. Support extensions 3 and 4 are arranged on both sides of plate 2 and a winding shaft 5 for the safety belt 6 is rotatably supported in support extensions 3 and 4. Rigidly fastened to the support extension 4 is a guide ring 7, which has at its cylindrical ring portion a multiplicity of stamped-out guide vanes 8, which are bent toward the center of the ring.

A structural unit which can be slipped and coupled onto the end of the winding shaft 5 protruding beyond the support extension 4, consists of a cupshaped receptacle 9, a cup-shaped screw cap 10 and a coupling ring 11. The shaft end engages in a hole of the receptacle 9 and is coupled to the latter by means of a coupling boss 12 or the like. The receptacle 9 at its cylindrical circumference has at the height of the guide ring 7 several jet nozzles 13 directed substantially tangentially to the winding shaft 5 and perpendicularly to the guide vanes 8. The jet nozzles 13 are closed off by plugs or rupture discs, if the pullback device is not actuated, which plugs are not shown in the drawings. The receptacle 9 further has a liquid chamber 14 which extends in the radial direction, is filled with a liquid buffer and is constricted at the center by an inner extension 15. The screw cap 10 is screwed to the free cup rim of the receptacle 9 and has a hole 16 in a cup-shaped extension. The hole 16 can be closed off by a rupture disc 18 provided with a sealing ring 17. The coupling ring 11 is screwed onto a cylindrical threaded extension 19. The coupling ring 11 has an axial opening 20 as well as an insulating ring 21 which is placed on the circumferential surface of ring 11 and on which two slip rings 22 of an ignition contact device are mounted. The stationary ignition contact device has a terminal 23 with ignition lines 24 as well as suitably spring-loaded brushes 25. A tubular displacement element 26 is guided on the radial shoulders of the receptacle 9 and the screw cap 10. Element 26 is designed as a flat spiral spring having several turns covering the constricted part of the liquid chamber 14.

As shown in FIG. 3, a displacement element 27 may also be constructed as a tube formed of mechanically easily deformable sheetmetal material. Displacement element 27 is provided with several folded ribs 28 that can be expanded by the explosive pressure coming from the center, and take the shape indicated by the dash-dotted lines.

In the event of danger, i.e., if a given acceleration moment occurs, the ignition contact device is fired in a manner not described in detail. If the propellant charge contained in the interior of the threaded extension 19 of the screw cap 10 is ignited, the explosive pressure breaks the rupture disc 18 and the compressed gas flows into the liquid chamber 14. In order to prevent an undesirable breakthrough of the gas pressure wave directly onto the jet nozzles 13, the displacement element 26 or 27 is provided which is expanded radially by the explosion pressure until it rests against the inside surface of the cup rim and thus acts like a pressure piston on the liquid buffer. Under the action of the liquid pressure, the plugs are pushed out of the jet nozzles 13 and the liquid of the liquid buffer is thrown essentially tangentially to the winding shaft at high speed against the guide vanes 8 of the guide ring 7 with the result that a large torque is imparted on the structural unit 9/10/11 coupled with the winding shaft 5. The liquid can run off freely laterally to the guide ring 7. The mentioned torque causes a tightening of the safety belt 6 around the body of the vehicle passenger to be protected.

There are claimed:

1. In a retightener for safety-belt automatic wind-up devices having a winding shaft mounted in a bearing block, a safety belt wound around the shaft, a retightening element connected to the shaft, with a pyrotechnic propellant charge which when activated by firing the charge generates an explosive pressure on the retightening element to tighten the safety belt around the body of a motor vehicle passenger to be protected and a liquid medium disposed intermediate the retightener and the pyrotechnic propellant charge, the improvement comprising a receptacle having a circumferential surface containing the liquid medium coupled to the winding shaft and rotated with the winding shaft, and at least one jet nozzle disposed in the circumferental surface of the receptacle directed substantially tangentially to the axis of rotation of the winding shaft and against a stationary guide ring with guide vanes surrounding the receptacle wherein the guide ring together with the receptacle form a turbine system and wherein the liquid issuing from the jet nozzles when the propellant charge is fired, hits the guide vanes and thereby imparts a strong rotary impulse to the rotatable receptacle.

2. Retightener according to claim 1, wherein the guide ring has guide vanes which are bent toward the receptacle and are directed substantially perpendicularly to the jet direction of the jet nozzle.

3. Retightener according to claim 1, wherein the receptacle is connected via an axially closable opening to an axially arranged propellant charge, and wherein the receptacle has a chamber containing the liquid medium which chamber extends radially and is constricted in the center.

4. In a retightener for safety-belt automatic wind-up devices having a winding shaft mounted in a bearing block, a safety belt wound around the shaft, a retightening element connected to the shaft, with a pyrotechnic propellant charge which when activated by firing the charge generates an explosive pressure on the retightening element to tighten the safety belt around the body of a motor vehicle passenger to be protected and a liquid medium disposed intermediate the retightener and the pyrotechnic propellant charge, the improvement comprising a receptacle having a circumferential surface containing the liquid medium coupled to the winding shaft and rotated with the winding shaft, and at least one jet nozzle disposed in the circumferential surface of the receptacle directed substantially tangentially to the axis of rotation of the winding shaft and against a stationary guide ring surrounding the receptacle, wherein the receptacle is connected via an axially closable opening to an axially arranged propellant charge, and wherein the receptacle has a chamber containing the liquid medium which chamber extends radially and is constricted in the center and wherein a tubular displacement element which can be expanded radially by the explosive pressure of the propellant charge is disposed in the chamber containing the liquid medium.

5. Retightener according to claim 4, wherein the displacement element is constructed as a flexible, flat spiral spring which has several turns and can be expanded under pressure.

6. Retightener according to claim 4, wherein the displacement element is a tube constructed of easily deformable material and has radial folded ribs which can be expanded under pressure.

7. Retightener according to claim 4, wherein the receptacle together with an axial extension containing the propellant charge, form a rotatable structural unit which can be coupled to the winding shaft.

8. Retightener according to claim 7, wherein the axial extension containing the propellant charge has a screw cap which closes off the receptacle and is connected to a stationary ignition contact device consisting of a slip ring and brushes.

9. Retightener according to claim 8, wherein the extension containing the propellant charge is closed off by a coupling ring which in turn carries the ignition contact device.

* * * * *